A. JACOBSON.
MOWING MACHINE.
APPLICATION FILED OCT. 25, 1912.

1,184,533.

Patented May 23, 1916.

WITNESSES:
K. E. Anderson
Allen Berg

INVENTOR
Adolf Jacobson
BY
H. Anderson
ATTORNEY

UNITED STATES PATENT OFFICE.

ADOLF JACOBSON, OF NEW YORK, N. Y.

MOWING-MACHINE.

1,184,533.  Specification of Letters Patent.  Patented May 23, 1916.

Application filed October 25, 1912. Serial No. 727,641.

*To all whom it may concern:*

Be it known that I, ADOLF JACOBSON, a citizen of the United States, and resident of New York city, in the county of New York and State of New York, have invented certain new and useful Improvements in Mowing-Machines, of which the following is a specification.

This invention relates to lawn mowers, and has for its object, particularly, a machine adapted for ordinary mowing and is adapted at the same time for trimming walks, around trees, and around bushes and small plants.

The object is attained by the means set forth in this specification and the accompanying drawings, in which like numerals refer to similar parts in the several views.

Figure 1:
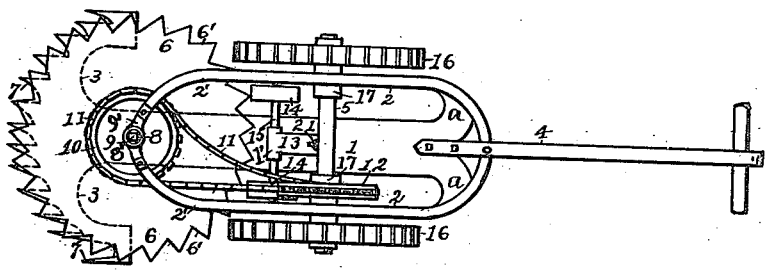
Figure 2:
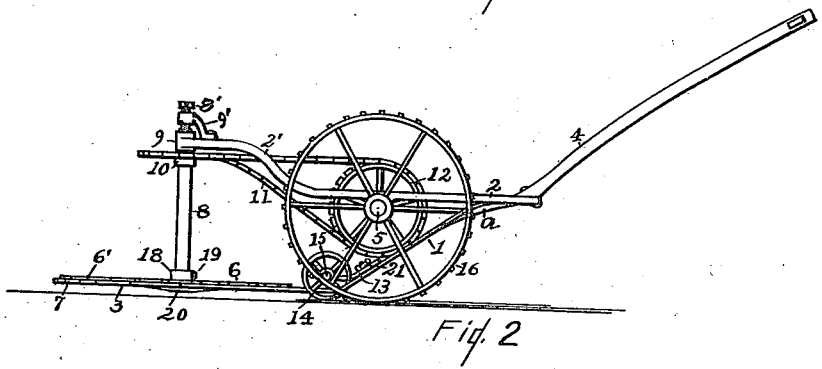
Figure 3:
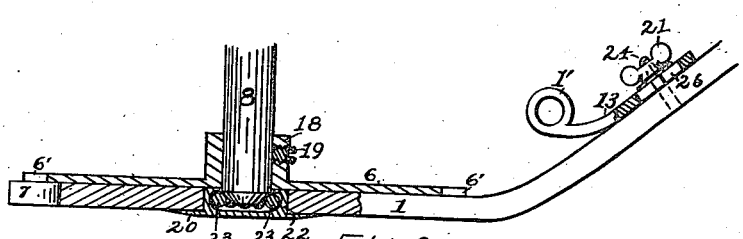

Figure 1 is a plan of the mower. Fig. 2 is a side elevation of the mower, and Fig. 3 is a partly sectional detail relating to the revolving cutter.

It will be seen that the machine comprises a frame 2 that is oval in plan, as in Fig. 1, but that its forward end is curved to an elevation in a higher plane than the main body of the frame, as shown at 2' in Fig. 2. This frame rests upon an axle 5, the hubs 17 in Fig. 1 representing the bearing for the axle.

To the rear end of the frame a stiff bar 1 is secured to the frame by the bifurcated ends *a a* of the bar. The bar drops at an angle from the frame to a point forward of the axle, from where it is extended parallel with the ground, at an elevation above the ground corresponding with the height that grass is to be cut. The wheels 16 on the axle support the structure. The wheels are higher than are usually used upon lawn mowers; and are to be provided with the usual ratchet, the usual means employed to avoid rotating the shaft backward.

The horizontal portion of the bar 1 is widened by wings 3 3, and the outer edge of the broadened part is semi-circular in form, the rearward sides of the wings being shaped as shown to avoid an unnecessary weight of metal. The outer circular edge is provided with teeth 7 as finger bars. Attention is called to the irregularity in the divisions and forms of the teeth.

In the forward end of the frame 2 is a bearing 9, Figs. 1 and 2, for a vertical shaft 8. A bearing for the same shaft is provided in the bar 1, at 20, directly below the bearing 9, and a vertical shaft 8 is supported in the said bearings. A circular cutter 6 is secured upon the said shaft, and revolves therewith, just making contact with the bar 1 and its fingered edge. The cutter 6 has teeth 6' in its periphery. The cutter has a hub 18, and a set-screw 19 in the hub affords means for adjusting the cutter upon its shaft.

To the frame 2 an arch-piece 9' is secured, and in the arch-piece is a set-screw 8' that bears against the upper end of the shaft 8, and prevents the lifting of the shaft.

Upon the axle 5 is a sprocket wheel 12, and there is a sprocket wheel 10 upon the shaft 8. A chain 11 passes around the two sprocket wheels, and is the means of conveying motion from the axle 5 to the shaft 8. A handle 4 is secured to the machine by joining it to the frame 2 and the bar 1.

To support the forward end of the machine, and to regulate the elevation of the finger bar, a pair of small wheels 14, Figs. 1 and 2 are provided. They turn on a shaft 15, and the shaft is secured in a movable stirrup 13, which is shown upon an enlarged scale in Fig. 3. A bolt 24 in the bar 1 extends through a slot 26 in the stirrup. A thumb nut 21 secures the stirrup, which is movable up and down the bar 1 within the limits of the slot. Sliding the stirrup up or down varies the elevation of the finger bar.

The teeth in the revolving cutter are uniform in shape, while the fingers are not even or uniform. The effect is that the machine can never be advanced rapidly enough to clog the teeth with grass, as the speed of the cutter, and the unsymmetrical forms of the fingers makes the cutting irregular, and the teeth are not all employed in cutting at any instant. This renders the operation of the machine exceedingly easy.

To further render this an easy operating machine the lower end of the shaft 8 is provided with a ball bearing, as shown in cross-section in Fig. 3. A steel bush 20 is chambered to receive balls 23, and the bush is secured in its position in the bar 1. The end of the shaft is beveled to complete a proper shape for the bearing as shown. The point of adjustment to keep the shaft properly in place is the set-screw 8'.

The wheels 16 are of large diameter. The frame is made in width so as to bring the wheels back of the circular cutter, so that the width of the cutter shall be greater than the width of the tread of the wheels. This makes it possible to cut close to any edge sidewise, and the machine can be made to do effective cutting in spaces where it could not be driven if the wheels controlled the space, as in other lawn mowers.

The general principles of this invention are shown in the accompanying drawings, but the construction thereof is susceptible of variations without a departure from the said principles.

Having described my invention, what I claim and desire to secure by Letters Patent, is—

A mowing machine comprising a frame support, bearings on the frame for the driving wheels' axle, driving wheels of large diameter on the axle, the axle turning in the said bearings on the machine frame, a bar supported by the frame and extending below the axle and outward parallel with the ground, the outer end of the said bar broadened to form a semi-circular edge, notches constituting fingers in the said semi-circular extension, a vertical shaft supported between the frame and the bar, a ball-bearing for the lower end of the shaft, an adjustable pivotal bearing for the upper end of the shaft, a circular cutter on the said vertical shaft superposed over the finger bar, said cutter adjustable on the shaft in relation to the bar, a sprocket wheel on the vertical shaft, a sprocket wheel on the axle, a chain connecting the said sprocket wheels, adjusting rollers located back of the cutter and forward of the axle, the rollers on a shaft, the shaft for the rollers having a bearing in a stirrup, the stirrup adjustable on the cutter bar, and a handle attached to the frame of the machine.

Signed at Peekskill, in the county of Westchester and State of New York this 19th day of October A. D. 1912.

ADOLF JACOBSON.

Witnesses:
   JABEHERA JACOBSON,
   ALLEN BARGER.